(12) United States Patent
Nair et al.

(10) Patent No.: US 8,938,457 B2
(45) Date of Patent: *Jan. 20, 2015

(54) INFORMATION CLASSIFICATION

(75) Inventors: Manoj Nair, Cary, NC (US); Stephen Perrin, Chapel Hill, NC (US); Iva Blazina Vukelja, Everett, MA (US); Alex Rankov, Danville, CA (US); Mark Weng Soon Wah, Cary, NC (US); Naveen Sunkavally, Morrisville, NC (US); John Philip Bell, Bunanumera (IE)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,512

(22) Filed: Mar. 7, 2012

(65) Prior Publication Data

US 2013/0066843 A1 Mar. 14, 2013

Related U.S. Application Data

(63) Continuation of application No. 11/528,772, filed on Sep. 27, 2006, now Pat. No. 8,135,685.

(60) Provisional application No. 60/826,072, filed on Sep. 18, 2006, provisional application No. 60/826,073, (Continued)

(51) Int. Cl.
*G06F 7/00* (2006.01)
*G06F 17/30* (2006.01)
(Continued)

(52) U.S. Cl.
CPC .... *G06F 17/30598* (2013.01); *G06F 17/30115* (2013.01); *H04L 41/12* (2013.01); (Continued)

(58) Field of Classification Search
None
See application file for complete search history.

(56) References Cited

U.S. PATENT DOCUMENTS 6,003,040 A 12/1999 Mital et al.
6,167,445 A 12/2000 Gai et al.
(Continued)

FOREIGN PATENT DOCUMENTS

EP 1855218 A2 11/2007
WO WO 2008/036621 3/2008

OTHER PUBLICATIONS

U.S. Appl. No. 11/692,058, filed Mar. 27, 2007, Perrin et al.
(Continued)

*Primary Examiner* — Rehana Perveen
*Assistant Examiner* — Raheem Hoffler
(74) *Attorney, Agent, or Firm* — Workman Nydegger

(57) ABSTRACT

Providing information classification in a computer system for use in an information management system. Information management provides services such as data protection, backup, retention, compliance, etc., by classifying the objects and/or environment of an entity according to its value to the entity. Initially a series of rules are identified relating to information management services. Using these rules, information is classified into categories by using a series of plugins that relate to specific characteristics of information within data. Often, classification includes the collection and/or generation of metadata. After the data is classified, service level objectives can be identified and mapped to service levels. After service levels are selected, the corresponding actions can be orchestrated such that the objects of the entity received the selected services in the service level.

23 Claims, 3 Drawing Sheets

Related U.S. Application Data filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
- *H04L 12/24* (2006.01)
- *H04L 29/08* (2006.01)
- *G06F 17/00* (2006.01)

(52) U.S. Cl.
CPC ........ *H04L41/5003* (2013.01); *H04L 41/5009* (2013.01); *H04L 67/16* (2013.01); *Y10S 707/99931* (2013.01); *Y10S 707/99942* (2013.01)
USPC ................ 707/741; 707/694; 707/999.001; 707/999.101

(56) References Cited

U.S. PATENT DOCUMENTS

| | | | |
|---|---|---|---|
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 6,865,728 B1 | 3/2005 | Branson et al. | |
| 7,185,073 B1 | 2/2007 | Gai et al. | |
| 7,240,076 B2 | 7/2007 | McCauley et al. | |
| 7,278,156 B2 | 10/2007 | Mei et al. | |
| 7,363,292 B2 | 4/2008 | Chaboche | |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,565,656 B2 | 7/2009 | Yamasaki et al. | |
| 7,580,357 B2 | 8/2009 | Chang et al. | |
| 7,613,806 B2 | 11/2009 | Wright et al. | |
| 7,616,642 B2 | 11/2009 | Anke et al. | |
| 7,640,345 B2 | 12/2009 | Nair et al. | |
| 7,676,798 B2 * | 3/2010 | Snover et al. | 717/139 |
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 7,739,239 B1 | 6/2010 | Cormie et al. | |
| 7,752,312 B1 | 7/2010 | Perrin et al. | |
| 7,895,220 B2 | 2/2011 | Evans et al. | |
| 7,953,740 B1 | 5/2011 | Vadon et al. | |
| 8,069,435 B1 | 11/2011 | Lai | |
| 8,104,080 B2 | 1/2012 | Burns et al. | |
| 8,548,964 B1 | 10/2013 | Nair et al. | |
| 8,620,724 B2 * | 12/2013 | Adhiraju et al. | 705/7.36 |
| 2002/0016800 A1 * | 2/2002 | Spivak et al. | 707/523 |
| 2002/0091746 A1 | 7/2002 | Umberger et al. | |
| 2002/0120685 A1 | 8/2002 | Srivastava et al. | |
| 2002/0161883 A1 | 10/2002 | Matheny et al. | |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0093528 A1 | 5/2003 | Rolia | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0212778 A1 | 11/2003 | Collomb | |
| 2003/0225829 A1 | 12/2003 | Pena et al. | |
| 2003/0233391 A1 | 12/2003 | Crawford et al. | |
| 2003/0233464 A1 | 12/2003 | Walpole et al. | |
| 2003/0236904 A1 | 12/2003 | Walpole et al. | |
| 2004/0060002 A1 | 3/2004 | Lucovsky et al. | |
| 2004/0098415 A1 | 5/2004 | Bone et al. | |
| 2004/0133876 A1 * | 7/2004 | Sproule | 717/105 |
| 2004/0215650 A1 | 10/2004 | Shaji et al. | |
| 2004/0236660 A1 | 11/2004 | Thomas et al. | |
| 2004/0243699 A1 | 12/2004 | Koclanes et al. | |
| 2005/0060662 A1 | 3/2005 | Soares et al. | |
| 2005/0071182 A1 | 3/2005 | Aikens et al. | |
| 2005/0102297 A1 | 5/2005 | Lloyd et al. | |
| 2005/0125768 A1 | 6/2005 | Wong et al. | |
| 2005/0132034 A1 | 6/2005 | Iglesia et al. | |
| 2005/0177545 A1 | 8/2005 | Buco et al. | |
| 2005/0197852 A1 | 9/2005 | Gebhard et al. | |
| 2005/0235342 A1 | 10/2005 | Ene-Pietrosanu et al. | |
| 2005/0251533 A1 | 11/2005 | Harken et al. | |
| 2005/0262097 A1 | 11/2005 | Sim-Tang et al. | |
| 2005/0273451 A1 | 12/2005 | Clark et al. | |
| 2005/0289216 A1 | 12/2005 | Myka et al. | |
| 2006/0015388 A1 | 1/2006 | Flockhart et al. | |
| 2006/0036463 A1 | 2/2006 | Patrick et al. | |
| 2006/0039364 A1 | 2/2006 | Wright | |
| 2006/0092861 A1 | 5/2006 | Corday et al. | |
| 2006/0095543 A1 | 5/2006 | Ito et al. | |
| 2006/0095570 A1 | 5/2006 | O'Sullivan | |
| 2006/0101084 A1 | 5/2006 | Kishi et al. | |
| 2006/0106782 A1 | 5/2006 | Blumenau et al. | |
| 2006/0112108 A1 | 5/2006 | Eklund et al. | |
| 2006/0114832 A1 | 6/2006 | Hamilton et al. | |
| 2006/0129974 A1 | 6/2006 | Brendle et al. | |
| 2006/0179143 A1 | 8/2006 | Walker et al. | |
| 2006/0236061 A1 | 10/2006 | Koclanes | |
| 2006/0248165 A1 | 11/2006 | Sridhar et al. | |
| 2006/0248187 A1 | 11/2006 | Thorpe et al. | |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0083875 A1 | 4/2007 | Jennings | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0162749 A1 | 7/2007 | Lim | |
| 2007/0192352 A1 * | 8/2007 | Levy | 707/102 |
| 2007/0208751 A1 | 9/2007 | Cowan et al. | |
| 2007/0214208 A1 | 9/2007 | Balachandran | |
| 2007/0226228 A1 | 9/2007 | Her et al. | |
| 2007/0260640 A1 | 11/2007 | Hamilton et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1 | 1/2008 | Irle et al. | |
| 2008/0049642 A1 | 2/2008 | Gudipudi et al. | |
| 2008/0059387 A1 | 3/2008 | Vaidhyanathan et al. | |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0077682 A1 | 3/2008 | Nair et al. | |
| 2008/0077995 A1 | 3/2008 | Curnyn et al. | |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0301760 A1 | 12/2008 | Lim | |
| 2009/0064185 A1 | 3/2009 | Araujo | |
| 2009/0077210 A1 | 3/2009 | Musman et al. | |
| 2009/0150431 A1 | 6/2009 | Schmidt et al. | |
| 2009/0157881 A1 | 6/2009 | Kavuri et al. | |
| 2010/0250497 A1 | 9/2010 | Redlich et al. | |
| 2013/0110810 A1 | 5/2013 | Nair et al. | |

OTHER PUBLICATIONS

U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell II.
U.S. Appl. No. 11/772,192, filed Jun. 30, 2007, Nair et al.

(56) References Cited

OTHER PUBLICATIONS

U.S. Appl. No. 11/864,596, filed Sep. 28, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,770, filed Sep. 28, 2007, Nair et al.
U.S. Appl. No. 11,864,774, filed Sep. 28, 2007, Nair et al.
U.S. Appl. No. 11/528,898, filed Mar. 1, 2012, Office Action.
U.S. Appl. No. 11/772,179, filed Mar. 29, 2012, Office Action.
U.S. Appl. No. 11/864,764, filed May 3, 2012, Office Action.
U.S. Appl. No. 11/528,783, filed Aug. 15, 2012, Final Office Action.
U.S. Appl. No. 11/528,790, filed Jul. 18, 2012, Final Office Action.
U.S. Appl. No. 11/528,898, filed Oct. 2, 2012, Final Office Action.
U.S. Appl. No. 11/694,753, filed Aug. 31, 2012, Notice of Allowance.
U.S. Appl. No. 11/694,764, filed Aug. 1, 2012, Office Action.
U.S. Appl. No. 11/772,192, filed Jun. 12, 2012, Final Office Action.
U.S. Appl. No. 11/864,605, filed Jul. 3, 2012, Office Action.
U.S. Appl. No. 11/694,764, Nov. 29, 2012, Final Office Action.
U.S. Appl. No. 11/772,179, Nov. 13, 2012, Final Office Action.
U.S. Appl. No. 11/864,605, Nov. 8, 2012, Final Office Action.
U.S. Appl. No. 11/864,770, Feb. 4, 2013, Office Action.
U.S. Appl. No. 11/864,764, Dec. 10, 2012, Final Office Action.
U.S. Appl. No. 11/528,772, Sep. 12, 2008, Pre-Interview First Office Action.
U.S. Appl. No. 11/528,772, Dec. 22, 2008, First Action Interview.
U.S. Appl. No. 11/528,772, Jun. 3, 2009, Final Office Action.
U.S. Appl. No. 11/528,772, Jan. 28, 2010, Office Action.
U.S. Appl. No. 11/528,772, Aug. 10, 2010, Final Office Action.
U.S. Appl. No. 11/528,772, Mar. 3, 2011, Office Action.
U.S. Appl. No. 11/528,772, Oct. 27, 2011, Notice of Allowance.
U.S. Appl. No. 11/528,783, Nov. 7, 2008, Pre-Interview First Office Action.
U.S. Appl. No. 11/528,783, Feb. 24, 2009, Office Action.
U.S. Appl. No. 11/528,783, Jun. 25, 2009, Final Office Action.
U.S. Appl. No. 11/528,783, Jan. 15, 2010, Office Action.
U.S. Appl. No. 11/528,783, Sep. 1, 2010, Final Office Action.
U.S. Appl. No. 11/528,783, Feb. 10, 2012, Office Action.
U.S. Appl. No. 11/528,790, Jul. 12, 2010, Office Action.
U.S. Appl. No. 11/528,790, Jan. 13, 2011, Final Office Action.
U.S. Appl. No. 11/528,790, Jan. 23, 2012, Office Action.
U.S. Appl. No. 11/528,898, Sep. 5, 2008, Pre-Interview First Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,898, Oct. 7, 2009, Final Office Action.
U.S. Appl. No. 11/528,900, Jun. 9, 2008, Office Action.
U.S. Appl. No. 11/528,900, Jan. 23, 2009, Final Office Action.
U.S. Appl. No. 11/528,900, Aug. 25, 2009, Notice of Allowance.
U.S. Appl. No. 11/692,051, Aug. 26, 2009, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/692,058, Jul. 9, 2009, Office Action.
U.S. Appl. No. 11/692,058, Jan. 8, 2010, Final Office Action.
U.S. Appl. No. 11/692,058, Jul. 6, 2010, Office Action.
U.S. Appl. No. 11/692,058, Jan. 24, 2011, Notice of Allowance.
U.S. Appl. No. 11/694,753, Mar. 25, 2009, Office Action.
U.S. Appl. No. 11/694,753, Nov. 18, 2009, Final Office Action.
U.S. Appl. No. 11/694,753, Mar. 29, 2010, Office Action.
U.S. Appl. No. 11/694,753, Oct. 5, 2010, Final Office Action.
U.S. Appl. No. 11/694,753, Jan. 19, 2011, Office Action.
U.S. Appl. No. 11/694,753, Jun. 17, 2011, Final Office Action.
U.S. Appl. No. 11/694,753, Jan. 26, 2012, Office Action.
U.S. Appl. No. 11/694,764, Jan. 28, 2010, Office Action.
U.S. Appl. No. 11/694,764, Aug. 4, 2010, Final Office Action.
U.S. Appl. No. 11/694,764, Mar. 17, 2011, Office Action.
U.S. Appl. No. 11/694,764, Sep. 26, 2011, Final Office Action.
U.S. Appl. No. 11/694,783, Feb. 6, 2009, Office Action.
U.S. Appl. No. 11/772,179, Aug. 19, 2009, Office Action.
U.S. Appl. No. 11/772,179, Feb. 23, 2010, Final Office Action.
U.S. Appl. No. 11/772,192, Apr. 15, 2010, Office Action.
U.S. Appl. No. 11/772,192, Oct. 29, 2010, Final Office Action.
U.S. Appl. No. 11/772,192, Jan. 5, 2012, Office Action.
U.S. Appl. No. 11/864,596, Nov. 12, 2009, Office Action.
U.S. Appl. No. 11/864,596, May 26, 2010, Final Office Action.
U.S. Appl. No. 11/864,596, Mar. 11, 2011, Office Action.
U.S. Appl. No. 11/864,596, Oct. 7, 2011, Final Office Action.
U.S. Appl. No. 11/864,605, Jan. 14, 2010, Office Action.
U.S. Appl. No. 11/864,605, May 28, 2010, Final Office Action.
U.S. Appl. No. 11/864,605, Nov. 4, 2010, Office Action.
U.S. Appl. No. 11/864,605, Mar. 9, 2011, Final Office Action.
U.S. Appl. No. 11/864,760, Nov. 24, 2009, Office Action.
U.S. Appl. No. 11/864,760, Apr. 7, 2010, Final Office Action.
U.S. Appl. No. 11/864,760, Jul. 27, 2010, Office Action.
U.S. Appl. No. 11/864,760, Jan. 27, 2011, Final Office Action.
U.S. Appl. No. 11/864,770, Nov. 27, 2009, Office Action.
U.S. Appl. No. 11/864,770, Apr. 21, 2010, Final Office Action.
U.S. Appl. No. 11/864,770, Nov. 3, 2010, Office Action.
U.S. Appl. No. 11/864,770, Apr. 19, 2011, Final Office Action.
U.S. Appl. No. 11/864,764, Jan. 27, 2011, Office Action.
U.S. Appl. No. 11/864,764, Aug. 29, 2011, Final Office Action.
U.S. Appl. No. 11/864,774, May 11, 2011, Office Action.
U.S. Appl. No. 11/864,774, Dec. 9, 2011, Final Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/772,192, Aug. 12, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 11/528,790, Jan. 10, 2014, Final Office Action.
U.S. Appl. No. 11/864,770, Nov. 26, 2013, Office Action.
U.S. Appl. No. 11/861,764, Nov. 20, 2013, Office Action.
U.S. Appl. No. 11/772,179, Oct. 11, 2013, Office Action.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,790, May 8, 2014, Notice of Allowance.
U.S. Appl. No. 11/772,179, Jul. 3, 2014, Final Office Action.
U.S. Appl. No. 11/864,596, Jun. 16, 2014, Notice of Allowance.
U.S. Appl. No. 11/864,770, May 16, 2014, Final Office Action.
U.S. Appl. No. 11/864,764, Jun. 25, 2014, Final Office Action.
U.S. Appl. No. 11/864,774, Apr. 15, 2013, Notice of Allowance.
U.S. Appl. No. 13/719,084, Jul. 26, 2013, Office Action.
U.S. Appl. No. 13/719,084, Jan. 6, 2014, Notice of Allowance.
U.S. Appl. No. 13/972,089, Apr. 16, 2014, Notice of Allowance.

* cited by examiner

INFORMATION CLASSIFICATION

CROSS-REFERENCE TO RELATED APPLICATIONS

This application is a continuation, and claims the benefit, of:

U.S. Non-provisional application Ser. No. 11/528,772 filed Sep. 27, 2006 and entitled "INFORMATION MANAGEMENT", which claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND OF THE INVENTION

1. The Field of the Invention

The present invention relates to information management. More particularly, embodiments of the invention relate to systems and methods for classifying structured and/or unstructured data for use in assigning service areas and service level objectives to objects in a computer system.

2. The Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming the principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, often there is a large amount of unstructured data, meaning that the value of the data to the entity is not readily known, nor are the services required to manage the data. For example, an entity may have a file storage system that is regularly backed up, despite the presence of files on the system that have little or no value to the entity. Thus, without an effective way to sort, classify, and maintain the files, the entity pays for unneeded services.

Additionally, there may be data that is subject to certain state and federal regulations based on information stored in the content of the data. Without a method of searching data based on content, certain data or files may not receive the services mandated by the regulations, and the entity may be subject to liability.

Generally, there are a number of factors used to determine how data is handled and which services are needed to properly maintain the data. Some of the factors or considerations commonly used include data security, data backup, data retention, data access control, regulatory compliance, corporate compliance, and the like or any combination thereof.

Because most data systems are unstructured and inadequately classified, it is difficult to ensure that the appropriate services are being applied. In fact, even when one attempts to classify data, decisions on how to manage the data are complicated by limitations based on the organization of the entity, irrespective of the data. For example, any given entity typically has more than one "line of business." An engineering firm, for example, mainly involved with contract work for the government, often has data that is associated with the actual engineering work being performed. At the same time, the firm may also have data associated with the legal department, human resources, or other administrative aspect of the firm. While some data may belong exclusively to one line of business, other data may be shared between more than one line of business. Some of the data associated with the engineering work, for example, may have legal implications, making it necessary for both lines of business to have access for the data. In other words, a given entity often has various domains of data or different shares of data, which may belong individually to a line of business or may be shared among the various lines of business.

For each line of business, data is often subject to certain requirements that differ from the requirements that apply to data associated with other lines of business. Further, each line of business may have a different way of referring to types of data. Thus, each line of business will likely desire that the data receive a different type of service from an information service, making it difficult to establish a uniform system of classification that will satisfy the demands of each of the lines of business.

Currently, information classification systems use a one-dimensional system to determine what levels of service objects receive. Rather than taking into account the realities of current business entities, these systems typically classify objects according to only one service category. This methodology restricts such entities from effectively managing and safeguarding their data. As a result, entities may have too much or too little protection for their data. Thus, there is a need for an information classification system which provides a more effective and efficient way to classify data objects.

BRIEF SUMMARY OF THE INVENTION

These and other limitations are overcome by embodiments of the invention, which relate to systems and methods for providing information classification. Information classification according to embodiments of the present invention enables an entity to ensure that its data is adequately categorized, allowing the entity to better maintain and service the data according to its needs using an information management system.

Information management systems often offer different types of services for objects in a computing system. Information management systems can also identify services that objects, including data, require. Further, information management systems also enable entities to better evaluate the value of their data independent of services. Typically, in order for the management system to perform a requested service, it is essential for the data to be properly classified so that the system is able to accurately differentiate between data that requires the service and data that does not. Embodiments of the invention provide classification mechanisms that enable an entity to identify service needs for each object independently. Being able to focus in on particular objects in an automated fashion is highly beneficial as an entity can understand the value of its structured and unstructured data. This is particularly true in computer systems that have hundreds of thousands of objects.

Embodiments of the invention relate to an information management system that can evaluate data to identify the appropriate service levels. However, embodiments of the invention also enable entities to better evaluate and value their existing data, even when service levels are not changed. In other words, the ability to generate reports about existing objects, in addition to object classification, is within the scope of the invention. In one example, the ability to know what services are required for data helps an entity better understand and valuate its data.

In order to properly classify data, the information management system first seeks to discover objects in a computer system. The objects can include data, servers, applications, and/or services operating or present in the computer system. As these objects are discovered, they can be classified based on what is known about them via discovery. During the classification process, existing metadata can be augmented with newly generated metadata, providing more information for classification purposes.

Classification can take place in two different stages. Initially an information management system can classify objects according to characteristics relating to the infrastructure or environment of the objects. In an additional classification procedure, the system can use information about objects gathered during the initial discovery or environment classification together with a series of rules that are applied to the actual information stored within the data to generate additional metadata that may be used to classify information.

During the information classification process, a series of adaptors may be used to discover metadata and/or generate additional metadata. Some or all of the metadata may be used together with the rules to classify or categorize the data. These rules typically correspond to various service categories and may correspond to metadata, data content, or data environment and will be used to classify the data. Often, an entity is able to develop its own set of rules that can be used in the classification process. This aspect enables the entity to valuate its data based on its own criteria. Further, objects can be automatically evaluated on a per object basis and embodiments of the invention are not fettered by coarse characterizations that are often applied to whole data shares and/or entire directories in conventional systems.

During this classification, objects or data are typically assigned to at least one service category. Some data may be assigned to multiple categories. Once the categories are assigned, then service level objectives can be defined and mapped to service levels. After the service levels are selected, the information management system may then orchestrate the implementation of selected services.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
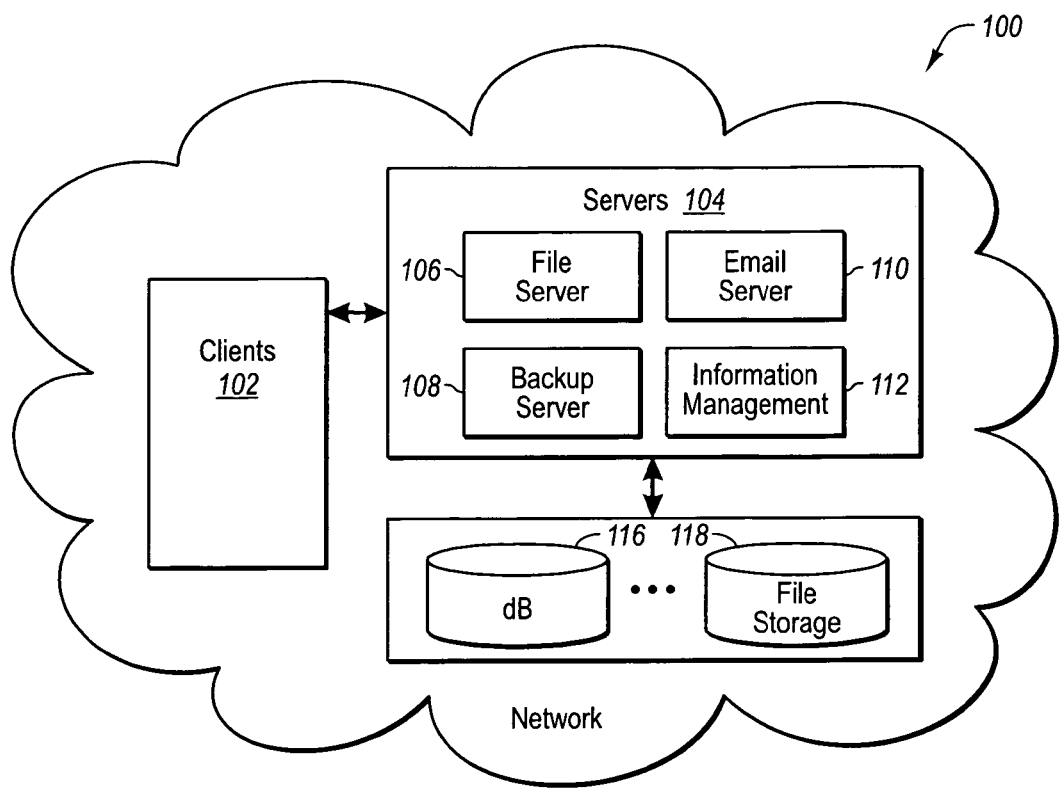
FIG. 1 illustrates an exemplary environment for implementing embodiments of the invention.

Embodiments of the invention relate to the classification of objects in a system such as a computer system. Classifying objects enables an information management system to identify and orchestrate services such as data protection, data placement, corporate compliance, and others based on the value of the underlying data. Embodiments of the invention enable the data to be classified in a highly automated fashion that provides various levels of granularity that can be adjusted as needed. An entity can be assured that its data is receiving the services that are actually required. In another embodiment, classification or categorization enables an entity to evaluate the value of its data independently of or in conjunction with services identified herein.

Implementing information classification in accordance with the present invention requires an understanding of computer systems, networks, or servers operating on the systems, services operating on the system, and of the objects (files, data, content, servers, databases, applications, information, emails, etc.) that exist in or are accessible by clients, servers, applications, and services on the system. By way of example only, a computer system can be a single computer, a collection of computers (including clients, servers, and applications) that are connected with a network, and the like or any combination thereof.

The knowledge needed to implement information management and in particular to perform information classification can be obtained through discovery of the computer system, which provides the information management system with an understanding of the relationships that may exist between the various servers (and other devices) on the computer system and the data that is accessible over the system. According to the present invention, the discovery of a network provides the information management with information that can be used to classify the network and the data in the system.

After the computer system (environment and data) have been discovered, it is useful to classify the data that is in the system. For example, embodiments of the invention enable each object to be categorized and classified individually according to a series of entity-defined rules, although default rules can also be applied. An object can be any data (e.g., file, content, email, web page), server, service, application or the like in the system or in the environment in which information management is practiced. Classification is discussed more fully below and typically uses series of rules or logic that are applied to or based on the environment, content, or metadata to differentiate the data. A further aspect of the present invention includes the generation of metadata during the classification. Then, using the existing metadata and metadata generated during the classification process, categories can be assigned to each object.

Once classification is complete, an information management system may us the categories created during information classification to perform service level management. Service level management provides methods for modeling/mapping the results of discovery and/or classification to service levels. Service level objectives, for example, can be determined based on the assigned categories. After service level objectives have been identified, the various service levels can be selected. Next, the selected services are orchestrated and executed. Thus, information classification is one part of a broader information management service and it provides a mechanism whereby the management services may be be carried out with respect to individual objects rather than on shares or drives. As a result, an entity may only pay for the services that are actually needed rather that pay for services that may not be needed. Further, data, including unstructured data, is categorized and can be provided with the services based on its value to the entity. In one embodiment, classification is a way for an entity to automatically place a value on the various objects of data.

Information management is also a process that can be ongoing. Information management can also be implemented in various types of environments. Embodiments of the invention, for example, can be implemented on computer systems such as a single computer or in a network or series of computers. In each of these examples of a computer system, the environment and data are discovered and classified. Service levels are then identified based on the categorizations assigned during information classification. The resulting services associated with the service levels may then be orchestrated. Alternatively, the categorization may be used to evaluate existing data without requiring the selection and orchestration of services.

In most computer systems, objects are continually added to the system and those objects typically require certain services. In addition to new objects, many objects also have a lifecycle associated with them. Other objects may change over time (by being edited, for example). As a result, the status or need for services for certain objects can change over time. Information management incorporates lifecycle aspects such that data that grows old or stale can have the various services changed as needed.

Also, embodiments of the invention include reports, auditing, and the like to ensure that the services being provided are adequate. This protective ability ensures, for example, that a company complies with any applicable rule or regulation. The detection of a gap in service, for example, can lead to a change in service levels.

I. Computer System Environment

FIG. 1 illustrates an exemplary environment for implementing embodiments of the invention. FIG. 1 is intended to illustrate that, while many systems often have similar functions, the actual implementation from one computer system to the next can vary significantly. The variability in computer system configurations is one of the aspects that have hindered conventional attempts at information management. The variability may be related, for example, to the type of software installed, the hardware selected for the computer system, the configuration of the hardware/software and the like. As previously described, this is one of the reasons that discovery of a computer system is not limited to the objects in the system but also includes discovery of the servers and services that are operating in the system. An understanding of the servers and services can improve the ease and accuracy with which objects are classified.

In this example, the system 100 represents a network such as a local area network, a wide area network, and the like or any combination thereof. As previously discussed, this example is exemplary only and should not be construed as a limitation. The present invention may be used in a computer system comprised of a single computer or in a series of computers connected using a network, or by any other manner known to those of skill in the art. Furthermore, the connections in the system or network 100 can be wired and/or wireless. In this case, the network 100 typically includes clients 102 that have access to various servers 104 and to data 114. Various applications and services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the applications that operate on the servers 104, clients 102, and on the data 114 in some instances, may have certain properties or configurations. As previously discussed, it is this variability that can often complicate the ability to manage the information in a computer system.

II. Information Management in a Computer System

As discussed above, information classification is typically a portion of a larger information management system. In order to more fully explain the information classification process, a brief explanation of the methodology of information management is presented. Following this introduction, a more detailed explanation of the information classification process according to the present invention will be given below.

Information classification enables an entity to understand or to evaluate its own data. As a result, it is often advantageous for the entity itself to provide or define some of the logic or rules that are used to classify or categorize the objects in the network or system. Thus, embodiments of the invention enable an entity to control some or all of the logic used for classification. This illustrates one way that embodiments of the invention enable an entity to better value its data: Using the entity's logic or rules, the classification system categorizes the individual data, which is then associated with a service level objective. Using the cost of performing the services as a standard for valuing the underlying data, the entity can then determine the value of its data. Additionally, an entity may utilize this system to determine whether or not to proceed with a service objective by using the classification system to determine the number of data objects requiring a service objective together with the costs of performing such services.

For example, an entity may want to retain objects that were authored by a particular person for a long period of time. A rule to that effect that is processed for the objects of the entity can then help classify the objects in an automated manner and the entity may evaluate the cost of assuring that all objects that satisfy that requirement receive the appropriate services. Advantageously, the present invention enables the entity to use the classification system to evaluate the cost of implementing the desired service levels.

While this example illustrates the evaluation of a single rule or objective, an information management system can examine all business objectives for the objects in a a computer system, not just one at a time and use the information classification process to associate those objectives to the files without disrupting any additional associations. For example, some of the files authored by a particular person may also contain personal data on employees who have left the entity. Such files often fall under laws that require their destruction after a certain time period. Thus, some of the files authored by the person may need to be retained for a shorter length of time due to a more pressing consideration (regulations). One embodiment of information classification can thus consider both the desire to retain files written by the author and consider regulations at the same time, for each object. Thus aspect of the present invention enables a sophisticated information management system to recognize conflicting service goals without disassociating the data from any of the service areas, as in this example, and then resolve the conflict. User defined configurations, for example, may be used to resolve conflict. For example, regulations may have priority over an entity's desire to retain certain files. In other example, the objectives may not conflict, but be additive. For example, an entity may desire to retain all files written by a particular author and make those files searchable by indexing them.

Information management also reduces various risks (such as non-compliance) often associated with data including unstructured data. As described below, embodiments of the invention provide a system for classifying data such that the appropriate services can be provided to the data. Embodiments of the invention also enable services that are required by an entity to be effectively identified and orchestrated. Examples of the services often required by entities for their data include backup services, retention services, corporate compliance services, regulatory compliance, data accessibility, data deletion, access control, disaster recovery, and the like or any combination thereof.

A. Discovery in Information Management

Figure 2:
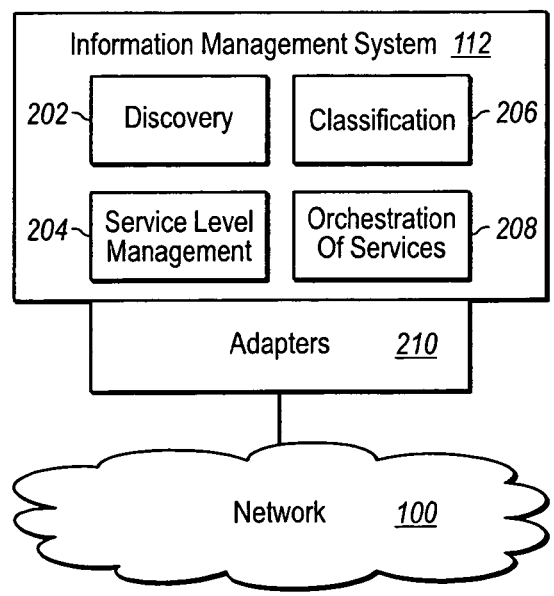
FIG. 2 illustrates one embodiment of a system and/or method for providing information management.

FIG. 2 is a flow diagram illustrating an exemplary system and method for information management of data including unstructured data files or objects. FIG. 2 provides a preliminary overview of information management, with information classification discussed in greater detail below with respect to FIGS. 3 and 4.

Discovery 202 is often the first aspect of information management. Generally, in one method of information management, discovery 202 includes both a discovery of the infrastructure or of environment objects (servers, devices, applications, etc.) and of the other objects (data, files, etc.) in the computer system. Thus, discovery 202 may be used to discover all the data objects to be classified by the present invention.

The discovery of the environment, for example, can include a discovery of all IP devices on the computer system 100 that appear to act as a server. In discovering these servers, discovery 202 includes discovering services and applications as well. Thus, discovery 202 includes discovering the servers, services, applications and data residing in a system.

The discovery of a computer system can be done in a variety of ways. The discovery of the environment objects, for example, may involve an examination or analysis of all IP addresses existing in a network. Devices that act as a server can thus be identified. Once these servers are identified, additional information can then be sought from those servers.

Applications can also be discovered. For example, many entities often have a payroll application that includes software working in conjunction with a database. The database can be examined and may have certain table or logs when acting, for example, as source for payroll application. The traffic on a network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other objects.

The discovery of all objects in a computer system is accomplished, in one embodiment, through the use of adapters 210. Each adapter enables the information management system to discover information about objects in or operating in the computer system 100. For example, some adapters can identify objects acting as a server. Other adapters are specific to a particular type of server and may be able to collect firmware version, operating system, and other configuration data that is specific to that type of server. Other adapters can collect generated metadata or can examine the content to collect the existing metadata.

B. Classification in Information Management

Classification 206 is typically the next step in information management, and will be discussed more fully below. However, the discovery of an environment does not need to be repeatedly performed. Once an environment is discovered, information management can then focus on the data that is in the computer system. Classification 206 is the process of collecting information about the objects (data and/or the environment) of a computer system and then identifying or associating the objects with categories. One result of classification is to associate objects being classified with certain categories. More particularly, the information collected during discovery 202 can be used during classification 206 to assign categories to the objects. The resulting categories can be used in subsequent parts of information management as described below.

Classification 206, however, is not limited to the information collected during discovery. Classification 206 can also include, for example, applying sets of rules or other logic to the objects in a computer system and using these rules to generate metadata. The rules can be default rules or rules that are selected according to a line of business of the entity or for any other reason. For example, objects that include social security numbers may have to be retained for some period of time per governmental regulations. Alternatively, objects whose owner is a member of marketing may only be retained for a few years but require full indexing.

In addition to applying rules to the objects of the entity, classification 206 also includes the generation of metadata, and applying the categorization rules to existing and newly generated metadata to assign a category. Generated metadata includes values that are derived from an information objects rather than having been collected by the environment. For example, hash values can be generated and then used to identify duplicate objects. Another example of generated metadata is the case where the objects are examined for specified keywords and/or patterns. This generated metadata, or metadata derived from an object being analyzed, are useful during the classification process. Existing metadata, on the other hand, can be collected from the objects or from the environment. For example, the owner, size, share, etc., of a file can be collected and used to automatically categorize an object. The collected metadata (both generated metadata and/or existing metadata) can then be used to assign categories relating to the content of the object or the object itself. In some embodiments, a particular object may be associated with more than one category.

In another embodiment, aging considerations or object lifecycle can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

Figure 3:
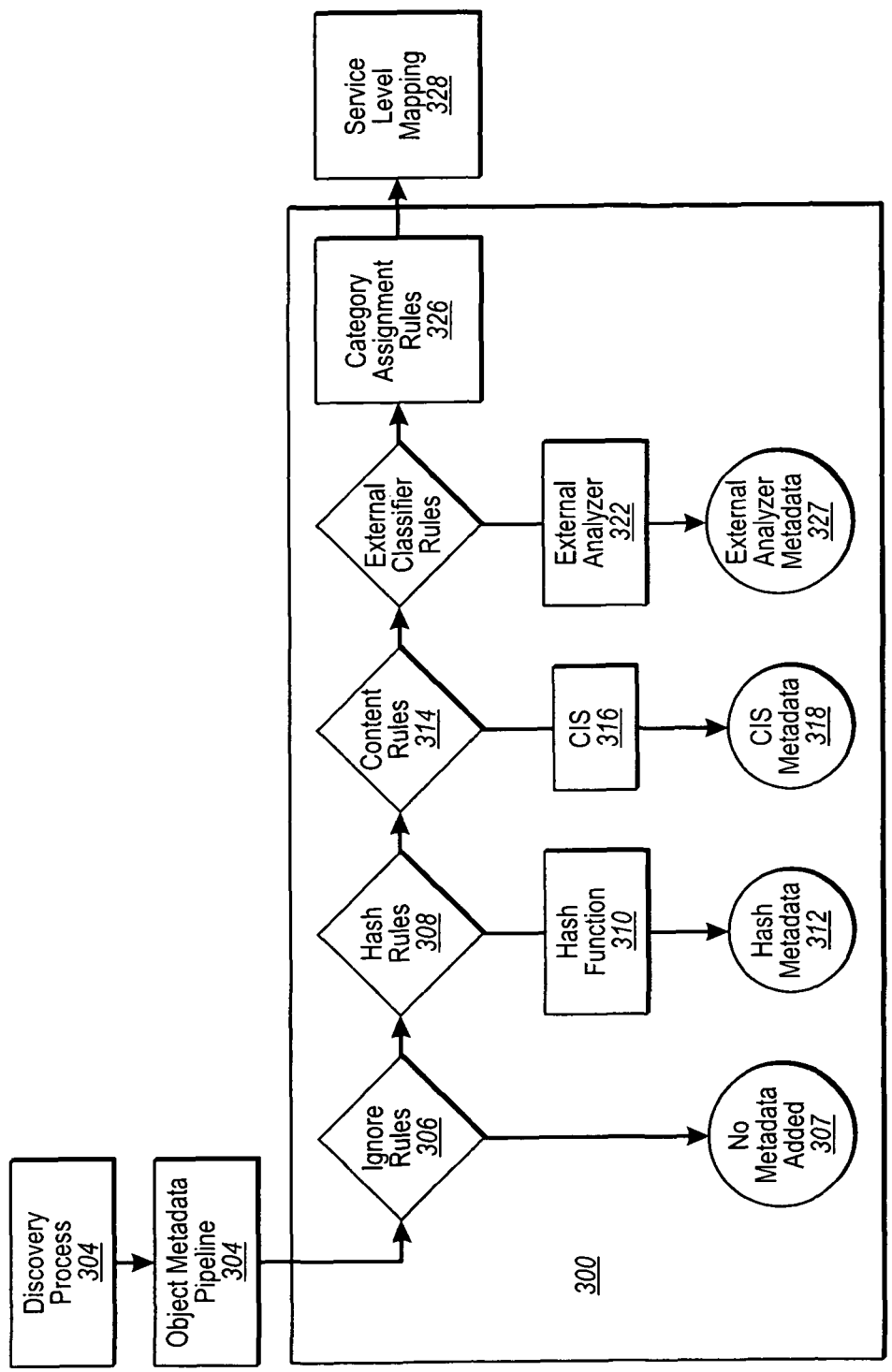
FIG. 3 illustrates a flow diagram for one embodiment of a method for providing classifying information.

FIG. 3 is a flow diagram illustrating one embodiment of information classification. In this example, information classification can be viewed as a pipeline that utilizes the metadata (existing and/or generated) for each object (e.g., file, email, etc.). Information classification 300 often follows a discovery process 302 mentioned above wherein an adaptor is used to discover information about the objects. During the discovery process 302, information collected about each object can be added to each object's corresponding metadata to be used during a subsequent classification process. Following discovery 302, the object metadata pipeline 304 proceeds to the information classification process 300.

The information classification process 300 may be rule driven, but can also include the generation of metadata using one or more adaptors to generate the metadata that the rules can operate on, for example. Metadata can be discovered or generated at any time. The rules used in classification may be specified by the information management provider by the owner of the objects, or another entity. The rules or taxonomies can include standard rules as well as user-defined rules (also referred to as logic).

According to one embodiment, the classification rules may correspond to data services offered by the information management provider that may be required for a specific category of data. Further, these rules may also correspond to industry or compliance regulation standards. For example, the information management provider may instruct the information classification process to search for objects within the system that include data patterns corresponding to social security numbers, names, or addresses, so that the information management system may perform services on those objects as required by federal or state regulations.

While rules may apply to general services provided by information management services, each rule may be comprised of several sub-rules relating to specific characteristics of the data to which the service applies. For instance, an entity may use one series of rules to define which data objects are to be analyzed for further classification, and another series of rules governing the categorization of objects during the classification process. Further, Boolean operators may be used to combine sub-rules; such as in the case where a rule involves the assignment of a category where either the object's size was less than 2 gigabytes and the file type was either a ".doc", ".pdf," or ".txt." Thus, each rule might have sub-rules corresponding to the location, content, hash, or other characteristic of an object.

According to the present invention, the information classification process may utilize these rules to generate additional metadata for each object which then may be used to drive further levels of classification. Thus, instead of simply discovering and classifying the information according to a simple set of rules, embodiments of the invention can cascade the discovery and classification, meaning that as objects are discovered and classified, additional content is added to each object's metadata, including increasingly detailed descriptions of environment data (including environment, applications, and content) by using the results from each stage of discovery and classification to drive the next stage.

Returning now to FIG. 3, the object metadata pipeline proceeds to the information classifier, where a series of plugins (such as adapters) are used with access to various rules and taxonomies used to classify the objects as previously described. If no rules relating to the hash or content of the objects are defined, or if the data object is of a type where the user does not desire a content analysis, then those content-based rules may be ignored 306 and no metadata is added to the objects 307. This feature of the present invention enables an entity to conserve valuable processing time and conserve resources by permitting the entity to establish a rule instructing the classification system to forgo the expensive content-analysis processes for some objects, such as a large indexing file or a binary file.

If there are rules associated with specific hash properties 308, for instance in scenarios where it is desirable to retrieve all duplicate copies of an object within a database, then a plugin (often accessed, for example, using an adapter) capable of performing a hash function such as a SHA-1 or MD5 computation is utilized and the results of the computation is added to the object's metadata 312 for use in later categorization.

If there are rules pertaining to the content of an object 314, then a plugin capable of determining the content of the objects will be used, such as content intelligence services (CIS) 316, providing additional information which is stored in the object's metadata 318. Additionally, additional plugins 322 may be used to in association with additional rules 320 in order to generate additional metadata 324 useful for further classification.

Next, by following the rules, categories for the objects and devices in the environment 326 are identified and stored in the metadata of each respective object 327. In this manner, each object is associated with one or more categories by the information classification process.

One aspect of the present invention is the system's ability to recognize independent groupings (domains) of information owners, each of which can configure separate logic for classification and service mapping, even when service options (list of available service levels) are common to all groupings. Thus, whereas conventional information classification systems provide for an object to belong to only one area of service protection, the present invention is more closely tailored to current business models where various groups, or lines of business, may each have different considerations in determining the importance and relevance of information and the service levels each object requires. For instance, an engineering department may have only a cursory interest in the ability to retrieve files associated with each revision of an antiquated product-line, while the legal department may desire the same files to be easily accessible for litigation purposes. Under the embodiment of the present invention, each business line or domain may be associated with a different service level to be considered in determining the importance and relevance of each object within the management scheme.

FIG. 3 thus illustrates one example of information classification whereby specific categories are assigned to each object by the application of rules as applied to information (metadata) that is known about each object and its relation to other objects.

C. Service Level Mapping in Information Management

With reference to FIGS. 2 and 3, the pipeline 304 next proceeds to the next step in the information classification process, which according to one embodiment of the present invention is service level mapping 328, which uses the categories assigned during information classification to identify service level objects. Examples of service level objectives include backup, retention, tiered storage, encryption, access control, disaster recovery, and the like or any combination thereof for the objects or for the various environment of the computer system.

After the objects have been categorized during classification 206, service levels or service level objectives can then be identified for the various objects during service level management 204. A category can be mapped through configuration data in one example to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflict, for example, using user supplied logic.

In other words, the classification process has already assigned categories to each of the objects. During the classification process, some of the various categories are assigned to each object as applicable. These categories can then be used to identify the service level objectives that may apply to the various objects. The classification, for example, may have identified a particular object as an annual report. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time, which may be different.

In this manner, the object that has been classified is then processed to identify the various service level objectives that should apply to the object. The service level objectives can then be bundled together into a target bundle that represents the service level objectives that are desired for the object. Next, service level mapping includes matching the target bundle of services with service packages that are actually available from service providers. If the service level objectives of the current bundle do not match or are not satisfied by the best matching actual service package, then a service gap is present. While embodiments of the invention may be used to select a particular service package, the invention could actually be used to provide services on a per object basis. Service providers, for reasons of practicality, often group services as a package and thus a service package is often selected, but embodiments of the invention extend beyond this particular aspect.

The use of service packages is often used by some entities that manage some or all of their services by restricting the offerings to a number of supported combinations of service levels. In other words, the particular combination of service level objectives may not correspond to a supported service package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration of services 208 is the process by which the services are orchestrated. Orchestration can automate multiple service actions and translate an end user service level request to provider action. The workflow needed to execute the services are coordinated during orchestration. Often, action orchestration requires the adapters to communicate with various service providers or with the various services to identify the service that can perform the requested action.

Figure 4:
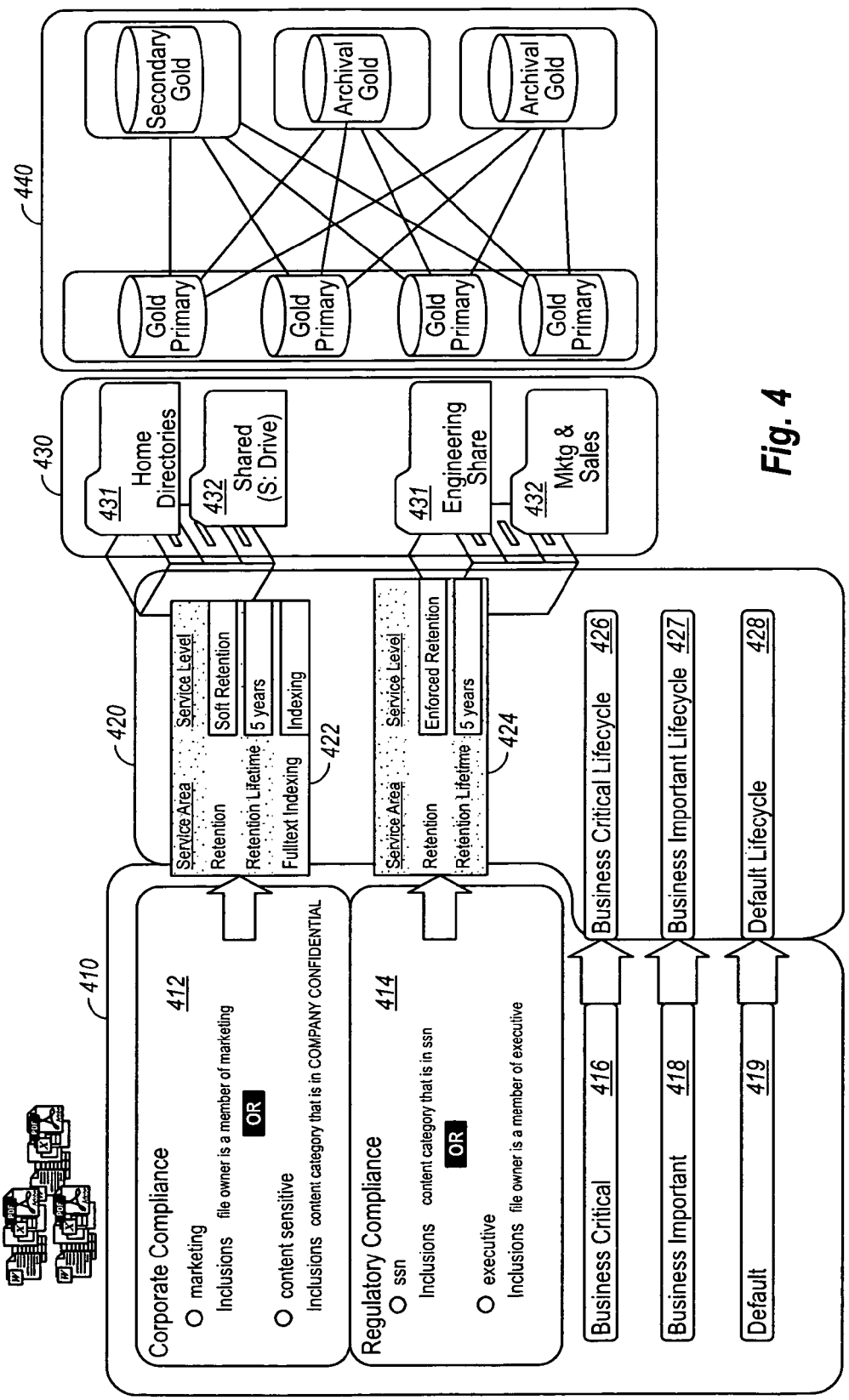
FIG. 4 illustrates an exemplary system and method for classifying or categorizing objects, such as data or content, in a computer system.

FIG. 4 illustrates an example of information management utilizing the present invention including information classification. In this example, some of the discovery has already occurred and some information is known about the objects in the computer system. For example, existing metadata may have already been collected using one or more adapters. Further, some metadata may have been generated by other adapters or collected via the adapters. In either case, a series of rules 410 are established to classify the information with a corresponding request for information management services 420 and the series of rules 410 can be applied to the collected information including the existing metadata and/or the generated metadata.

Examples of rules that may be used in the classification process are illustrated. For example, rule 412 is associated with corporate compliance. When the rule is applied, it can identify specific objects that satisfy this rule 412. Based on this rule (and others in some embodiments), at least one category can be assigned to the objects that satisfy the rule 412. The assigned category can then be used to identify service level objectives for those objects. The identified service level objectives can then be mapped to certain service levels.

More specifically, the entity may decide to classify information according to file ownership, (e.g. where the file owner is a member of marketing) or by data content (e.g. where the data includes the sensitive content). In addition, the entity may select a level of service to apply to any data that will be associated with the corporate compliance category. In field

422, the entity may specify levels of service including such as retention level, retention lifetime, and full-text indexing.

In another rule 414, the rule is associated with regulatory compliance and enables an entity to classify information according to content (e.g. social security number contents) or by ownership characteristics (e.g. file owner is an executive). In field 424, the entity may select the aspects of the service level of the regulatory compliance category by specifying requirements in the area of retention and retention lifetime.

Additional rules that are available for use in information classification are also available. For example, rule 416 instructs the classification system to create a category of data corresponding to "Business Critical" data, or data that is still highly relevant for use in an entity's ongoing business, and designates the business critical category for the "Business Critical Lifecycle". Similarly, rule 418 instructs the classification system to create a category of data corresponding to "Business Important" data and designates any data associated to the category for a "Business Important Lifecycle" 427. Lastly, the classification system may include a rule 419 indicating a search for data that has not been categorized according to any other rule during the classification process and indicate the default level of service level required for the data 428.

The entity may also indicate which objects to include in the classification system. In this example, the entity's computer system 430 including home directories 431, shared drives 432, engineering share 433, and marketing and sales share 434 are designated for classification.

In one embodiment the information management system will use a service orchestration system to automate the service requests 420 and translate the service level requests to service providers 440.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that stores data objects, a method for providing information management for data objects, the method comprising:
   at a processor of a computer system,
   automatically collecting information describing data objects in the computer system, the information including first metadata collected from each data object,
   applying first rules to the data objects, wherein application of the first rules to the data objects causes the generation of second metadata relating to the data objects, wherein each data object is associated with its own generated metadata, wherein applying the first rules further comprises ignoring some of the rules based on a particular data object, wherein the first rules includes ignore rules, hash rules, content rules, and external classifier rules;
   applying second rules to at least the first metadata and the second metadata of each data object to assign at least one category of information management to each of the data objects, wherein each category assigned to a particular data object is based at least in part on the collected metadata and the generated metadata relating to that particular data object;
   identifying one or more service level objectives for each data object based on the assigned categories of each data object such that each data object is associated with service level objectives that are determined from the service level objectives of other data objects, the one or more service level objectives of each data object corresponding to one or more services to be provided to each data object, wherein the one or more service level objectives concern control of one or more aspects relating to the use of each of the data objects; and
   mapping the one or more service level objectives of each data object to a service level available in the computer system, wherein the service level for each data object includes a bundle of services that are provided to the data object and such that each data object receives customized services.

2. The method according to claim 1, wherein the one or more service level objectives comprise one or more of access control, data encryption, data deletion, disaster recovery, backup, and retention.

3. The method according to claim 1, wherein some of the generated metadata relates to a lifecycle of the data object.

4. The method according to claim 1, further comprising assigning one or more additional categories of information management to each of the data objects.

5. The method of claim 1, wherein automatically collecting information comprises using a plurality of adapters to collect the information including metadata regarding each object.

6. The method of claim 1, wherein the second rules use metadata associated with each data object describing the capabilities, features, hash, and/or content of each data object.

7. The method of claim 1, wherein the objects include at least one of directories, volumes, files, folders, user data, system data, applications, services, operating systems, instructions, and computer settings.

8. In a computer system that stores data objects, a method for providing information classification to provide information management to the data objects, the method comprising:
   at a processor of a computer system,
   applying first rules to each of the data objects to generate metadata for each of the data objects, wherein applying the first rules further comprises ignoring some of the rules based on a particular data object, wherein the first rules includes ignore rules, hash rules, content rules, and external classifier rules;
   applying second rules to at least the generated metadata in order to assign categories of information management for each data object based on metadata of each data object including the generated metadata;
   identifying one or more service level objectives for each data object based on the assigned categories of each data object such that each data object is associated with service level objectives that are determined from the service level objectives identified for other data objects, the one or more service level objectives corresponding to one or more services to be provided to each data object, wherein the one or more service level objectives comprise one or more of access control and data encryption; and
   mapping each of the one or more service level objectives of each data object to one of the service levels available in the computer system, wherein each service level includes a bundle of services available from the provider; and
   providing the services to the data objects, wherein the services are customized for each of the data objects.

9. The method as recited in claim 8, wherein the mapping performed only if, for each service level objective, a predetermined criterion is met.

10. The method as recited in claim 8, wherein the one or more service level objections further comprise one or more of data deletion, disaster recovery, backup, and retention.

11. The method of claim 8, wherein the first rules include one or more of hash rules, content rules, and classifier rules.

12. The method of claim 8, wherein the generated metadata is used by the second rules to assign the categories and wherein data objects can belong to more than one category of information management.

13. The method of claim 8, wherein generating metadata comprises one or more of:
   identifying an author of a particular data object;
   identifying a key word in the particular data object;
   identifying a pattern in the particular data object;
   identifying information in the particular data object associated with compliance with a policy;
   identifying information in the particular data object associated with corporate compliance; and
   identifying a lifecycle of the particular data object.

14. In a computer system that stores data objects, a method for providing information classification of data objects, the method comprising:
   at a processor of a computer system,
   automatically collecting information describing each of the data objects in the computer system;
   applying first rules to each of the data objects, wherein the first rules are based on the collected information, and wherein application of the first rules to each of the data objects causes the generation of metadata relating to the data objects, wherein applying the first rules further comprises ignoring some of the rules based on a particular data object, wherein the first rules includes ignore rules, hash rules, content rules, and external classifier rules;
   applying second rules to the collected information and the generated metadata to assign categories of information management to each of the data objects, wherein the categories assigned to a particular data object is based at least in part on metadata, including the generated metadata, relating to that particular data object;
   identifying one or more service level objectives for each data object based on the assigned categories of each data object such that each data object is associated with service level objectives that are determined from the service level objectives identified for other data objects, the one or more service level objectives corresponding to one or more services to be provided to each data object, wherein one or more of the service level objectives concern loss of the data objects; and
   mapping the one or more service level objectives of each data object to one of multiple service levels available in the computer system, wherein the service levels each include a bundle of services that are provided to the corresponding data objects, wherein each data object receives services that are customized, wherein data objects with different service level objectives may receive different services.

15. The method of claim 14, wherein the one or more service level objectives concerning loss of the data objects comprises one or more of data deletion, and disaster recovery.

16. The method of claim 14, wherein the one or more service level objectives further comprise one or more of backup, retention, tiered storage, encryption, and access control.

17. The method of claim 14, wherein generating additional metadata further comprises performing one or more of:
   applying a hash to each object;
   performing content analysis;
   requesting external analysis of each object;
   indexing each object;
   searching for keywords in each object; and
   searching for patterns in each object.

18. The method of claim 14, wherein some of the generated metadata relates to a lifecycle of the data object.

19. The method of claim 14, wherein the objects include at least one of directories, volumes, files, folders, user data, system data, applications, services, operating systems, instructions, and computer settings.

20. The method of claim 14, wherein the second rules are applied independently to the metadata associated with each data object describing the capabilities, features, hash, and/or content of each data object.

21. In a computer system that stores data objects, a method for providing information classification of data objects, the method comprising:
at a processor of a computer system,
identifying first rules and second rules relating to information management service levels in the computer system;
automatically collecting information describing each of the data objects in the computer system;
applying the first rules to each of the data objects individually, wherein the first rules are based on the collected information, and wherein application of the first rules to each of the data objects causes the generation of metadata relating to the data objects, wherein applying the first rules further comprises ignoring some of the rules based on a particular data object, wherein the first rules includes ignore rules, hash rules, content rules, and external classifier rules,
applying the second rules to at least the collected information and the generated metadata to assign categories of information management to each of the data objects, wherein the categories assigned to a particular data object are based at least in part on metadata, which includes the collected information and the generated metadata, relating to that particular data object;
identifying one or more service level objectives for each data object based on the assigned categories of each data object such that each data object is associated with service level objectives that are determined from the service level objectives identified for other data objects, the one or more service level objectives corresponding to one or more services to be provided to each data object, wherein a first one of the service level objectives concerns protection of the data objects by prevention of the performance of one or more unauthorized processes concerning the data objects,
mapping the first service level objective to a first service level available in the computer system for each data object associated with the first service level objective, wherein the first service level includes a first bundle of services, and
providing a service from the first bundle of services to the corresponding data objects, wherein only data objects whose assigned categories are mapped to the first service level objective receive the first bundle of services.

22. The method of claim 21, wherein the first service level objective concerns protection of the data objects comprises access control.

23. The method of claim 21, wherein the first service level objective concerns protection of the data objects comprises encryption.

* * * * *